(12) United States Patent
Lessmann

(10) Patent No.: US 9,170,578 B2
(45) Date of Patent: Oct. 27, 2015

(54) TOOL RECOGNITION WITH PROFINET

(75) Inventor: Gunnar Lessmann, Nieheim (DE)

(73) Assignee: Phoenix Contact GmbH & Co. KG (DE)

( * ) Notice: Subject to any disclaimer, the term of this patent is extended or adjusted under 35 U.S.C. 154(b) by 658 days.

(21) Appl. No.: 12/514,120

(22) PCT Filed: May 26, 2008

(86) PCT No.: PCT/EP2008/004171
§ 371 (c)(1),
(2), (4) Date: Sep. 14, 2009

(87) PCT Pub. No.: WO2008/145326
PCT Pub. Date: Dec. 4, 2008

(65) Prior Publication Data
US 2010/0094433 A1    Apr. 15, 2010

(30) Foreign Application Priority Data

Jun. 1, 2007  (DE) .......................... 10 2007 025 892

(51) Int. Cl.
*G06F 3/00*        (2006.01)
*G05B 19/042*     (2006.01)

(52) U.S. Cl.
CPC .. *G05B 19/0423* (2013.01); *G05B 2219/25009* (2013.01); *G05B 2219/25057* (2013.01); *G05B 2219/25061* (2013.01); *G05B 2219/25428* (2013.01); *G05B 2219/31134* (2013.01)

(58) Field of Classification Search
None
See application file for complete search history.

(56) References Cited

U.S. PATENT DOCUMENTS

| | | | | |
|---|---|---|---|---|
| 5,995,916 A | * | 11/1999 | Nixon et al. | 702/182 |
| 6,449,715 B1 | | 9/2002 | Krivoshein | |
| 7,032,029 B1 | * | 4/2006 | Tanzman et al. | 709/245 |
| 7,519,737 B2 | * | 4/2009 | Naismith et al. | 709/245 |
| 7,565,456 B2 | * | 7/2009 | Becker et al. | 710/8 |

(Continued)

FOREIGN PATENT DOCUMENTS

| | | |
|---|---|---|
| DE | 10 2004 017 529 A1 | 11/2005 |
| DE | 10 2005 004 265 A1 | 8/2006 |

(Continued)

OTHER PUBLICATIONS

PCT, "International Application No. PCT/EP2008/004171 International Preliminary Report on Patentability", Jan. 21, 2010, Publisher: Patent Corporation Treaty.

(Continued)

*Primary Examiner* — Henry Tsai
*Assistant Examiner* — Christopher Bartels
(74) *Attorney, Agent, or Firm* — Kaplan Breyer Schwarz & Ottesen, LLP

(57) ABSTRACT

The invention relates to a method for activating an automation station in the automation apparatus of an industrial application. The invention provides a method for activating an automation station in the automation apparatus of an industrial application, in which the automation station comprises a plurality of Profinet-compatible devices to which an unambiguous symbolic name is provided for identification, and wherein an identification of the automation station connected to the automation apparatus for operation is performed based on the symbolic names of the Profinet-compatible devices, and the Profinet-compatible devices are driven by the automation apparatus after connection of the automation station in functional dependence on the identified automation station.

4 Claims, 2 Drawing Sheets

(56) References Cited

U.S. PATENT DOCUMENTS

| | | | |
|---|---|---|---|
| 7,606,890 B1* | 10/2009 | Baier et al. | 709/224 |
| 8,433,827 B2* | 4/2013 | Biehler | 710/3 |
| 8,943,188 B2* | 1/2015 | Busgen et al. | 709/224 |
| 2004/0054774 A1* | 3/2004 | Barber et al. | 709/224 |
| 2004/0260405 A1* | 12/2004 | Eddie et al. | 700/3 |
| 2005/0083911 A1* | 4/2005 | Grabelsky et al. | 370/352 |
| 2005/0125509 A1* | 6/2005 | Ramachandran | 709/220 |
| 2005/0228509 A1* | 10/2005 | James | 700/19 |
| 2005/0240286 A1* | 10/2005 | Glanzer et al. | 700/18 |
| 2005/0243739 A1* | 11/2005 | Anderson et al. | 370/254 |
| 2005/0256939 A1 | 11/2005 | Naismith et al. | |
| 2006/0075009 A1* | 4/2006 | Lenz et al. | 708/160 |
| 2006/0173955 A1* | 8/2006 | Lessman | 709/203 |
| 2006/0190112 A1 | 8/2006 | Buesgen et al. | |
| 2006/0229737 A1* | 10/2006 | Esch et al. | 700/1 |
| 2007/0019641 A1* | 1/2007 | Pai et al. | 370/389 |
| 2007/0035396 A1* | 2/2007 | Chand et al. | 340/572.1 |
| 2007/0076724 A1* | 4/2007 | Hall et al. | 370/395.52 |
| 2008/0189441 A1* | 8/2008 | Jundt et al. | 710/3 |
| 2008/0320582 A1* | 12/2008 | Chen et al. | 726/12 |
| 2009/0276060 A1* | 11/2009 | Lu et al. | 700/21 |
| 2010/0074262 A1* | 3/2010 | Breit et al. | 370/400 |
| 2010/0077471 A1* | 3/2010 | Schleiss et al. | 726/13 |
| 2013/0086244 A1* | 4/2013 | Besold et al. | 709/223 |

FOREIGN PATENT DOCUMENTS

| | | |
|---|---|---|
| EP | 1 686 767 A1 | 8/2006 |
| JP | 07044478 A | 2/1995 |

OTHER PUBLICATIONS

"German Office Action for German International Application No. 10 2007 025 892.7-32", Dated: May 8, 2008, Publisher: German Patent Office, Published in: DE.

Gunnar Lessmann, "Future-Proof Migration Strategy Integration on the Interbus System in I/O Profinet", Dated: Sep. 2005, Publisher: Feldbusse & Netze—www.aud24.net, Published in: DE.

Gunnar Lessmann, "Interbus in Profinet—Integrate", Dated: Aug. 2006, pp. 32-33, Publisher: Phoenix Contact—www.automation.phoenixcontact.de, Published in: DE.

German International Search Report and Written Opinion, dated Sep. 12, 2008.

Koji Inagaki, "Japanese Patent Application No. 2010-509720 Office Action", Nov. 15, 2012, Publisher: JPO, Published in: JP.

* cited by examiner

TOOL RECOGNITION WITH PROFINET

FIELD ON THE INVENTION

The invention relates to a method for activating an automation station in the automation apparatus of an industrial application.

BACKGROUND OF THE INVENTION

In modern industrial applications such as automobile manufacturing or mechanical engineering, it is frequently necessary to be able to operate different tools on an apparatus in the plant, with field devices such as sensors or actuators that are necessary for tool functionality.

Profinet, which is well known to be the open Ethernet-based automation standard of the Profibus User Organization (PNO) and follows the Ethernet standard (according to the Institute of Electrical and Electronics Engineers (IEEE) 802.3) essentially 100%, is currently used generally for linking or integrating field devices in automation systems of industrial applications. Process and production data are available not only here on the field level, they can also be seamlessly integrated into multi-division data acquisition systems, thus enabling integration of the decentralized periphery in the vertical direction as well.

An essential difference between Profibus and Profinet lies in the different addressing of devices of the field devices connected in or to be connected into the respective network.

In contrast to the Profibus, the respective connected field devices inside a Profinet network are addressed by means of the specific and unambiguous Media Access control (MAC) address for each device, as well as the Internet Protocol (IP) address unambiguously assigned to this physical address.

Before the assignment of the physical and logical network addresses, however, each Profinet network component must be granted a symbolic name or Profinet device name for identification within the network for subsequent unambiguous addressing. The symbolic name or Profinet device name is set for the field device before the latter can be operated in a Profinet system. This granting is frequently referred to as "baptism."

In addition, these device names are made known in advance to a configuration unit that can be associated with the apparatus to which the field devices will be connected, and they are assigned a target configuration. This information from the configuration unit is subsequently transferred to a controller assigned to the apparatus for granting the IP addresses, as well as for parameterization and configuration of connected, identified field devices. If a field device is changed out, the "new" field device replacing the changed-out field device must be set up with the original Profinet name, i.e., the same name as that for the "old" field device being replaced.

Based on the Profinet standards, different automation stations for modern industrial applications, such as tools, together with integrated field devices necessary for the implementation of automation functionalities on an automation apparatus, such as a robot or a production machine, are activated according to prior art, essentially as described below with reference to FIG. 2, a highly simplified schematic sketch of automation stations according to prior art to be operated at an automation apparatus.

FIG. 2 shows an exemplary automation apparatus 100 operating according to the Profinet standard to which a configuration unit 600 is assigned. Three tools 200, 300 and 400 are to be connected to the automation apparatus 100 as automation stations in the operation.

First, the tools 200, 300 and 400 are coupled to the apparatus 100 in the operation. In the coupling process of tools 200, 300 and 400, they are supplied with power 1 in a first step via the supply units 107 arranged at the automation apparatus 100 and via the supply units 217, 317 and 417 arranged at the tools. Then a controller 101 recognizes the connected tool by way of special input information that has a special coding depending on the tool. The connected tool can be recognized via plug connectors, but also in a non-contact manner, e.g., via Radio Frequency Identification (RFID) techniques. In each case it is necessary to provide a special coding unit, labeled 218, 318 and 418 in FIG. 2, on the tool side and, on the automation apparatus 100 side, an interface unit 108, to which the coding information is transferred in a subsequent step 2. The automation apparatus 100 further comprises a field device 102 that is connected to the controller 101 and reads out the transferred coding information 3 and transfers it to the controller.

In addition, a number of Profinet-compatible field devices 501 and 502, 503 or 504-507 are installed on the tools 200, 300 and 400, wherein different numbers and types are possible and are generally required depending on the tool. The field devices 501 and 502, 503 and 504-507 are also supplied with power via the supply voltage of tools 200, 300 and 400, which is not shown in detail in FIG. 2 for the sake of comprehensibility. Then a connection 4 to these field devices is produced via a communications terminal 109 arranged on the automation apparatus 100 and via communications terminals 219, 319 and 419 arranged on the tools 200, 300 and 400, respectively. Each device is labeled unambiguously by its device name, as described above. The field devices 501-507 of all tools must thus have an unambiguous device name, referred to in the present example as "A," "B," "C," "D," "E," "F" and "G," which is permanently stored on the devices.

These device names "A," "B," "C," "D," "E," "F" and "G" are also planned and stored in advance in the configuration unit 600, and are made known to the controller 101 by configuration unit 600 for activation.

The controller 101 identifies the individual field devices 501-507, and then carries out the automation tasks necessary for activation, depending on the respective connected tool. For this purpose, it uses the information on the connected tool and on the field devices installed on the tools.

Essential disadvantages of the above-described prior art are based on the necessary tool coding.

The coding of tools for identification or recognition typically entails high cost, first because special interfaces 108 are necessary on the side of the automation apparatus 100 and an additional field device 102 is necessary for evaluating the coding. Moreover, the respective coding units can become contaminated or be destroyed in continuous operation, which may cause downtime.

SUMMARY OF THE INVENTION

One problem of the invention is to develop a method with which different automation stations can be operated on an automation apparatus during operation without a tool coding being necessary, and which method thus functions without the associated cost-intensive equipment for evaluating the coding.

The invention consequently proposes a method for activating an automation station at the automation apparatus of an industrial application in which the automation station comprises a number of Profinet-compatible devices, for each of which a respective unambiguous symbolic name is specified in advance for identification, wherein the automation station connected to the automation apparatus for operation is identified based on the symbolic names of the Profinet-compatible devices, and the Profinet compatible devices and driven by the automation apparatus after connection of the automation station in functional dependence on the identified automation station.

BRIEF DESCRIPTION OF THE DRAWINGS

The invention will be described below based on an exemplary embodiment with reference to FIG. 1.

In the drawings.

DETAILED DESCRIPTION

Figure 1:
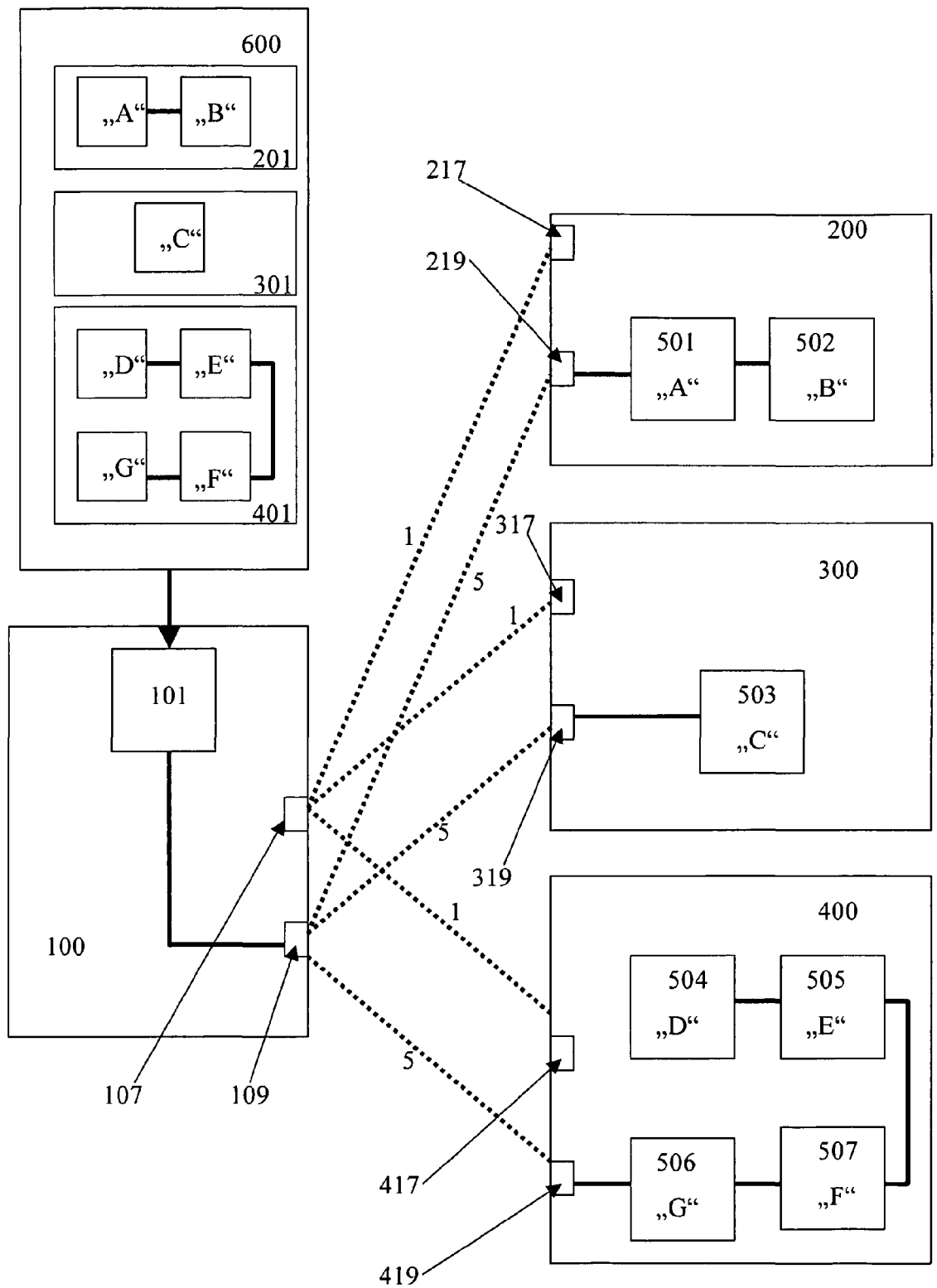
FIG. 1 shows a highly simplified schematic sketch of an automation station according to the invention to be operated at an automation apparatus.

FIG. 1, which shows a highly simplified schematic sketch of one embodiment according to the invention of automation stations to be operated in an automation apparatus, will be referred to below.

Figure 2:
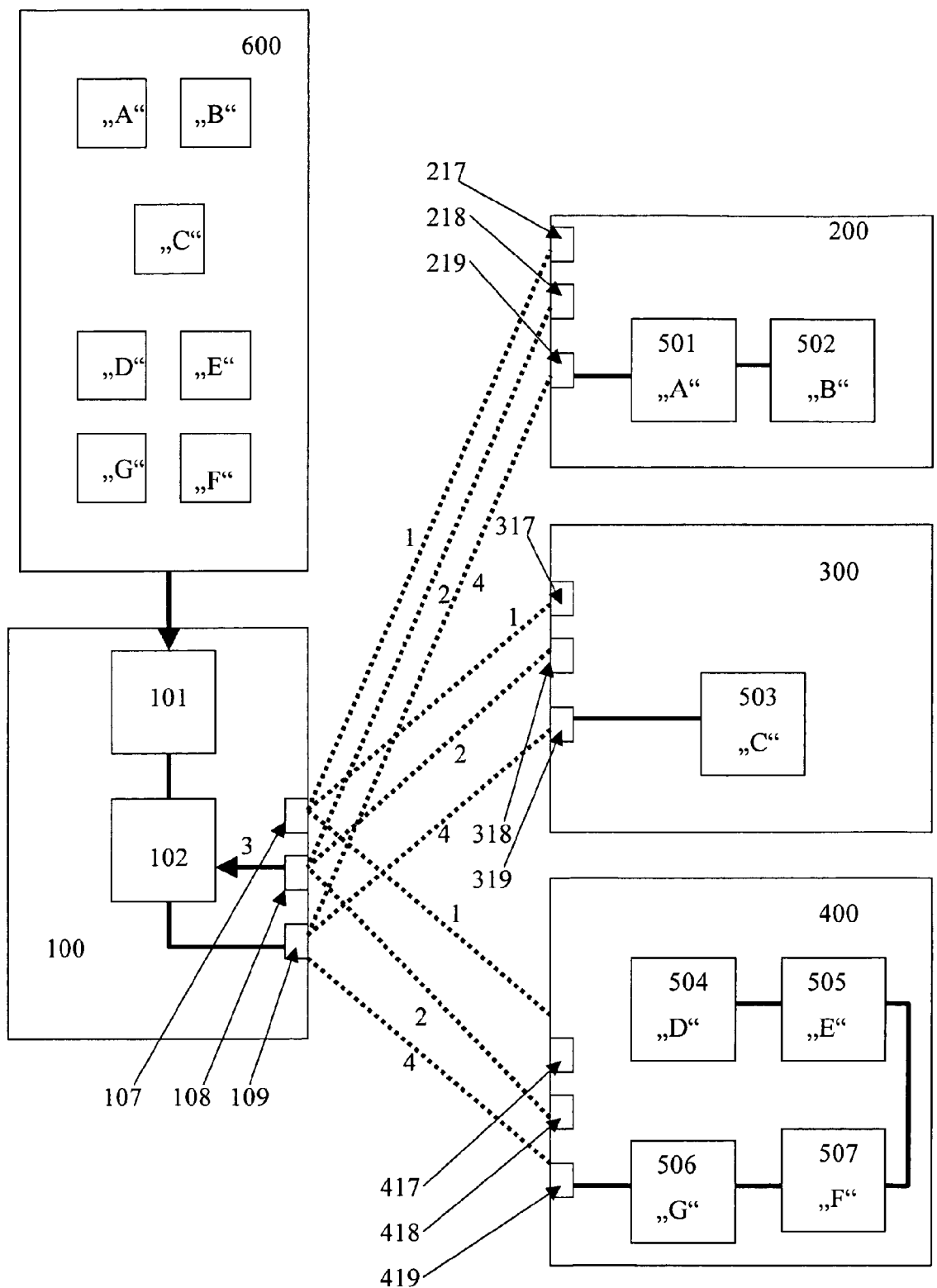
FIG. 2 shows a highly simplified schematic sketch of an automation station according to prior art to be operated at an automation apparatus.

Similarly to FIG. 2, FIG. 1 shows an exemplary automation apparatus 100, which is adapted to operate according to the Profinet standard and to which a configuration unit 600 is assigned. Three tools 200, 300 and 400 are to be connected as automation stations to the automation apparatus 100 in the operation, wherein again a number of Profinet-compatible field devices 501 and 502, 503 and 504-507, which can be different in number and type and are generally also necessary, are installed in tools 200, 300 and 400.

First, essentially as in the prior art, the tools 200, 300 and 400 are coupled to the device 100. In the physical coupling process of tools 200, 300 and 400, the latter are supplied in a first step with power 1 via a supply unit 107 arranged on the automation device 100 and via supply units 217, 317 and 417 arranged on the tools.

The field devices 501 and 502, 503 and 504-507 are also supplied with power via the supply voltage of the tools 200, 300 and 400, which is not shown in detail in FIG. 1 for reasons of comprehensibility.

Modifying the above-described prior art according to FIG. 2, however, there is no tool identification based on a special tool coding.

Instead, after coupling only communications connections 5 to these field devices are made via the communications terminal 109 arranged on the automation apparatus 100 and via the communications terminals 219, 319 and 419 arranged on the tools 200, 300 and 400, via which communications connections the unambiguous symbolic device names or Profinet device names "A," "B," "C," "D," "E," "F" and "G" of the field devices 501, 502, 503, 504, 505, 506 and 507 are transferred to the controller 101 of the automation apparatus 100.

In a particularly preferred embodiment, the field devices autonomously initiate a reporting process after the coupling of a respective automation station to the automation apparatus. The field devices 501-507 of the automation stations 200, 300 and 400 report autonomously via, for example, the communications connections 5 to the controller 101 and transfer their respective device names "A," . . . "G."

These device names "A," "B," "C," "D," "E," F" and "G" are in turn planned in advance in the configuration unit 600 and stored there. In addition, at least one logical assignment specification 201, 301 and 401 to an automation station is stored for each device name. For example, the planned and stored assignment specification 201 for the device names "A" and "B" is unambiguously logically linked in the configuration unit 600 to the automation station or tool 200.

To identify the field devices 200, 300 and 400, the device names and the respective assigned information stored for them are made known by the configuration unit 600 to the controller 101 for activation. Using this data stored in advance in the configuration unit, a field device comprised by the coupled automation station can be identified by the automation apparatus based on the Profinet device name. Moreover, the automation station itself can be identified on the basis of the assignment specification stored for the device names.

If, according to a particularly preferred refinement, at least one logical assignment specification 201, 301 or 401 to an automation station is stored for each device, which device further specifies an assignment for selected additional field devices comprised by this automation station, an identification of these selected additional field devices comprised by the automation station can simultaneously be performed by identifying a device after transfer of this information from the configuration unit 600 to the controller 101.

If, for example, the assignment specification 201 for the device names "A" and "B" that is planned and stored in the configuration unit 600 is unambiguously linked to the automation station or tool 200, and if it additionally specifies that the field device "B" also belongs to a common group of an automation station field identical to that of device "A," then the controller 101 assigns the identified device names to the planned groups, wherein the presence of an identified device name suffices for the identification of a group.

In practical terms, however, the tool 200, 300 or 400 is operated only after all field devices of a common group have reported. The activation of the automation station 200, 300 or 400 is thus expediently completed only after all the field devices comprised by the automation station have passed through the reporting procedure.

After the identification of the individual field devices 501-507 by the controller 101, it then, depending on the respective connected automation station that has been recognized according to the invention, carries out the automation tasks necessary for activation.

An essential advantage of the invention is thus that only information on the Profinet-compatible field devices installed in the automation station is used for the recognition of an automation station such as a tool. By means of a configuration unit, assignable to an automation apparatus, with the information on the field devices, the controller of the automation apparatus to which the automation station is being connected simultaneously receives planned information about the automation station that is performing the coupling, even for instance, being coupled to the automation apparatus while it is in operation. This planning comprises an assignment between field devices and the respective automation stations, or even individual groups, and preferably also the additional field devices contained in an automation station or in a group, wherein the devices are identified by their Profinet device names. This assignment enables the identification of a connected automation station without a special coding of the automation station and without the special identification mechanisms or equipment previously necessary for this purpose.

The invention claimed is:

1. A method for activating an automation station at an automation apparatus of an industrial application, the method comprising:

providing each Profinet-compatible device, in a plurality of Profinet-compatible devices that constitute the automation station, in advance of the assignment of physical and logical network addresses, with an unambiguous symbolic name, wherein the unambiguous symbolic name is for subsequent unambiguous addressing of the Profinet-compatible devices by means of said physical and logical network addresses;

connecting the automation station to the automation apparatus;

transferring each unambiguous symbolic name from the Profinet-compatible devices to said automation apparatus;

identifying the automation station connected to the automation apparatus for operation, based on the transferred unambiguous symbolic names of the Profinet-compatible devices; and driving the Profinet-compatible devices by the automation apparatus after connection of the automation station, in functional dependence on the identified automation station, and by addressing each respective Profinet-compatible device in the plurality by means of a specific and unambiguous Media Access Control (MAC) address being said physical network address for the respective Profinet-compatible device, as well as an Internet Protocol (IP) address unambiguously assigned to this physical address as said logical network address.

2. The method according to claim 1, further comprising:

storing, before activation of the automation station, each unambiguous symbolic name and for each unambiguous symbolic name a logical assignment specification to an automation station, in a configuration unit that is assignable to the automation apparatus;

physically coupling the automation station to the automation apparatus for activation; and identifying a first Profinet-compatible device comprised by the coupled automation station, by the automation apparatus on the basis of the unambiguous symbolic name of the first Profinet-compatible device, using the data stored in the configuration unit;

wherein the performing of the identification of the automation station is on the basis of the assignment specification stored for the symbolic unambiguous name.

3. The method according to claim 2, further comprising:

storing, before activation of the automation station, a logical assignment specification to the automation station and to a group of additional selected Profinet-compatible devices comprised by this automation station for each unambiguous symbolic name in the configuration unit assignable to the automation apparatus; and simultaneously performing, by the identifying of the first Profinet-compatible device, an identification of the group of selected additional Profinet-compatible devices comprised by this automation station.

4. The method according to claim 1, wherein the Profinet-compatible devices autonomously initiate a report procedure after the coupling of the automation station to the automation apparatus, and the activation of the automation station is completed only after all the Profinet-compatible devices comprised by the automation station have passed through this report procedure.

* * * * *